Nov. 7, 1961     T. L. SEABORNE     3,007,436
LIQUID FLOW INDICATOR
Filed July 21, 1959

INVENTOR.
THOMAS LESLIE SEABORNE

United States Patent Office 3,007,436
Patented Nov. 7, 1961

3,007,436
LIQUID FLOW INDICATOR
Thomas Leslie Seaborne, corner of Lygon St. and Brunswick Road, East Brunswick, Victoria, Australia
Filed July 21, 1959, Ser. No. 828,581
12 Claims. (Cl. 116—117)

This invention relates to an improved milk flow indicator for use on milking machines between the teat cup claw and the milk line for indicating the milking end point, that is to say the point at which the milk flow from the teat cup falls off to the extent that the teat cups should be removed from the cow.

The improved indicator is of the type having a main milk passage and a by-pass, the by-pass being of such size that it can cope only with the reduced flow of milk at the milking end point so that, during normal milking, the major portion of the milk passes through the main passage.

With such indicators, it has been proposed to use a sight glass functioning on the weir principle, a portion of the main milk flow being separated and diverted to a sight glass to give a visual indication of flow and also to some extent rate of flow through the main milk passage. Such devices, however, are seriously affected by froth which obscures the sight glass so that the milking end point is not clearly and truly indicated.

The present invention has for its object to provide an improved form of milk flow indicator of the above by-pass type in which the above disadvantages are effectively overcome.

According to the invention there is provided a milk flow indicator of the above type wherein the whole of the milk flow in excess of the by-pass flow is caused to pass through the sight glass so that a clear and unmistakable visual indication is given when the milking end point is reached by the absence of milk flow through the sight glass. Means may also be provided for preventing froth passing into the sight glass when the milk flow through the latter ceases, such means preferably comprising an expanding passage which, by reducing flow velocity, causes disintegration of the froth.

Figure 1:
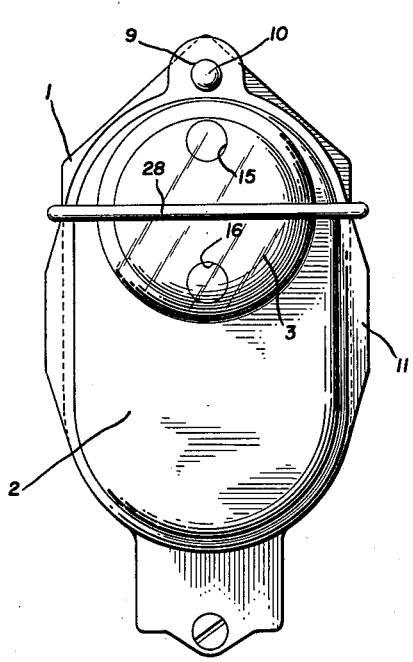
Figure 2:
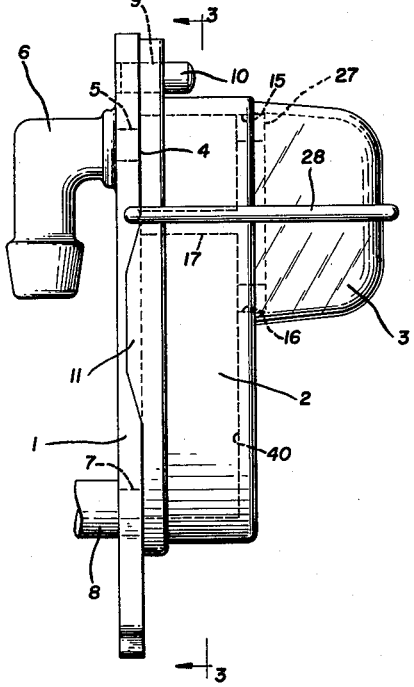
Figure 3:
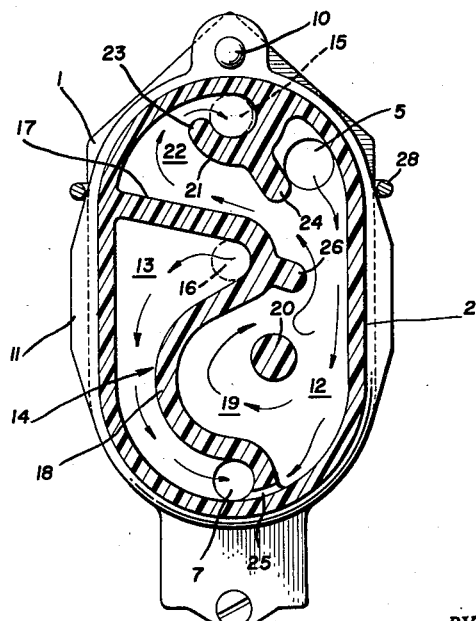

The invention is more fully described aided by reference to the accompanying drawings illustrating a representative form of the invention. In these views:

FIG. 1 is a front view of the improved flow indicator.
FIG. 2 is a side view.
FIG. 3 is a section taken on line 3—3 of FIG. 2 illustrating the interior of the body part of the indicator.

As is shown in these views, the improved indicator comprises a back plate 1 preferably of metal, a body part 2 which is preferably in the form of a rubber or plastic moulding and a front sight glass 3. The back plate 1 has a flat preferably ground front face 4 against which the body part 2 bears and, at its upper end, there is a milk inlet aperture 5 from a pipe 6 connecting to the teat cup claw while at its lower end there is an outlet aperture 7 to a pipe 8 connecting to the main milk line of the milking system.

The body part 2 is connected to the back plate 1 preferably by means of an eye 9 engaging a pin 10 on the back plate and the rear surface of the body is formed to closely seat on the face 4 of the back plate so that a leak proof fit is formed under the vacuum condition prevailing in the system. Lateral movement of the body part in relation to the back plate is prevented by providing moulded lugs 11 on the sides of the body part to engage or abut against the side edges of the back plate.

The body part 2 is of hollow formation divided into two chambers 12 and 13 by means of a sinuous partition 14. The chamber 12 at its upper end registers with the milk inlet aperture 5 in the back plate while the chamber 13 at its lower end registers with the milk outlet aperture 7. The upper end of the chamber 12 has a port 15 extending through the front wall 40 of the body part to form the milk inlet to the sight glass 3. The upper end of the chamber 13 also has a port 16 which likewise extends through the front wall 40 of the body part 1 and forms the milk outlet from the sight glass 3.

The partition 14 is of such shape as to provide a downwardly sloped upper part 17 and a bulged lower portion 18 which provides an enlarged chamber 19 at the lower portion of the chamber 12. Said enlarged chamber has a central stud 20 provided therein to promote a circulatory flow of milk in said enlarged chamber.

The port 15 is protected by a curved baffle 21 which diverges from the sloped upper part 17 of the partition 14 to form an expanding milk passage 22 leading to the port 15. The upper end of said baffle forms a milk cutoff point 23 adjacent to the port 15, while the lower part of the baffle has a downwardly sloped lug 24 adjacent to the aperture 5 to direct the milk downwardly into the enlarged chamber 19 of the chamber 12.

At its lower end, the partition 14 has a small port 25 providing a restricted by-pass between the two chambers 12 and 13. The partition also has a small downwardly sloped nose 26 positioned above the enlarged chamber 19.

The sight glass 3 is of semi-spherical or cup-like form with its base engaging a seating 27 on the front face of the body part 2. It is so arranged as to project substantially from the body part and thus be particularly conspicuous. It is preferably detachable for washing or other purposes and may be held in place by a wire loop or stirrup 28 pivoted to the back plate 1.

In use, the back plate 1 is preferably secured to a suitable support above the milking bail and the pipe 6 from the inlet aperture 5 connected to the milk dropper to the teat cup claw while the pipe 8 from the milk outlet aperture 7 is connected to the milk line of the milking system. Under the vacuum condition in the system, the body part 2 is held tightly against the face 4 of the back plate so that a fluid tight joint is formed.

The milk flowing from the teat cups enters through the inlet 5 and circulates in the enlarged chamber 19, some passing through the by-pass port 25 to the chamber 13 and thence to the outlet 7. The major portion of the milk, however, rises through the passage 22 and flows through the port 15 into the sight glass 3 and through said sight glass to the port 16 and chamber 13 to the outlet aperture 7.

When the flow of milk reduces to the point where the teat cups should be removed, the by-pass port 25 is able to cope with the reduced flow and the milk thus passes directly from the chamber 12 to the chamber 13 through said by-pass port. No milk thus passes up to the milk passage 22 to the sight glass inlet port 15 and accordingly no milk passes through the sight glass. A clear and unmistakable visual indication is thus given that the cow has been stripped and the teat cups should be removed.

Usually a reduced milk flow to approximately ½ pound of milk per minute is accepted as the milking end point and the size of the by-pass port 25 is calculated accordingly to give approximately such rate of flow. Any milk flow in excess of such by-pass rate causes milk to rise up the passage 22 and pass through the sight glass 3.

On the milk flow ceasing through the sight glass 3 froth is prevented from rising into the sight glass firstly by the nose 26 and baffle 24 and then by the expanding passage 22 which, by reducing flow velocity, causes disintegration of the froth. The sight glass is thus not obscured by froth likely to give a false indication of milk flow. The froth collects in the enlarged chamber 19 of the chamber 12 and ultimately passes through the by-pass port 25 to the outlet 7.

When the teat cups are removed any milk remaining in the body part 2 drains to the outlet 7, the downwardly sloping part 17 of the partition and the downwardly sloped baffle 24 and nose 26 facilitating such draining. The baffle 24 and nose 26 also provide drip points for the disintegrating froth.

When the machine is cleaned by circulatory washing by a detergent solution or the like as in my copending Australian patent application No. 202,938, the solution flows freely through the chambers 12 and 13 and, as the flow of such detergent solution is well in excess of the flow capacity of the by-pass port 25, the solution also flows through the passage 22 and sight glass 3 so that the whole of the device is effectively cleaned.

When the milking machine is stopped and a vacuum condition no longer prevails in the system, the body part 2 loosens from the face 4 of the back plate 1, allowing any residual detergent to drain away and allowing air to pass into the device. The sight glass 3 can also be readily removed, if desired, by releasing the securing loop or stirrup 28. The body part 2 can also be easily removed for inspection or cleaning simply by disengaging the eye 9 from the pin 10.

The improved indicator is robust in construction and suited for economic manufacture. It will function very effectively and, as the main milk flow passes through the sight glass, it also enables the milking habits of individual cows to be observed. The sight glass 3 is also very conspicuous so that it can be clearly viewed from a distance. The construction also facilitates cleaning and easy dismantling for inspection or other purposes.

What I claim is:

1. A milk flow indicator of the type mentioned comprising a back plate, a body part fitted on said back plate, a sight glass on the body part, a partition in the body part dividing it into two chambers, one of which forms an inlet chamber and the other an outlet chamber a bypass in the partition of suffifficient size to cope with the milk flow at the milking end point, and ports leading from the two chambers to the sight glass so that the whole of the milk flow in excess of the by-pass flow is caused to pass from the inlet chamber through the sight glass to the outlet chamber whereby a visual indication is given when the milking end point is reached by the absence of milk flow through the sight glass.

2. A milk flow indicator as claimed in claim 1 wherein the sight glass is of semi-spherical or cup shape.

3. A milk flow indicator as claimed in claim 2 wherein the sight glass has its base seated on the front face of the body part.

4. A milk flow indicator as claimed in claim 3 wherein the sight glass is detachably held in place by a wire loop or stirrup pivoted to the body part.

5. A milk flow indicator as claimed in claim 4 wherein the back plate has a flat front face aginst which the body part is seated with a fluid-tight seal by the vacuum condition in the system.

6. A milk flow indicator as claimed in claim 5 wherein the body part is connected to the back plate by an eye engaging a pin.

7. A milk flow indicator as claimed in claim 6 wherein lateral movement of the body part in relation to the back plate is prevented by lugs on the sides of the body part engaging the side edges of the back plate.

8. A milk flow indicator as claimed in claim 1 wherein the chamber in the body part into which the milk enters has means to prevent froth passing to the sight glass when the milk flow through the latter ceases.

9. A milk flow indicator as claimed in claim 8 wherein the froth prevention means comprise an expanding passage leading to the port to the sight glass, such passage, by reducing flow velocity, causing disintegration of the froth.

10. A milk flow indicator as claimed in claim 9 wherein the expanding passage is formed by a sloped surface on the partition and a curved baffle protecting the port leading to the sight glass.

11. A milk flow indicator as claimed in claim 10 wherein the froth prevention means also includes a downwardly sloped nose on the partition and a downwardly sloped baffle on the curved baffle.

12. A milk flow indicator as claimed in claim 11 wherein the partition is of sinuous form having a bulged portion forming an enlargement for the collection of froth.

References Cited in the file of this patent
UNITED STATES PATENTS
2,697,944　　Wenham _____ Dec. 28, 1954